(12) United States Patent
Ablondi et al.

(10) Patent No.: US 7,788,088 B2
(45) Date of Patent: Aug. 31, 2010

(54) NATURAL LANGUAGE INTERACTION WITH LARGE DATABASES

(75) Inventors: William J. Ablondi, New York, NY (US); Vaibhava Goel, Elmsford, NY (US); Ea-Ee Jan, Ardsley, NY (US); Benoit Emmanuel Maison, Wavre (BE); Jerome L. Quinn, North Salem, NY (US); Karthik Visweswariah, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 11/329,559

(22) Filed: Jan. 11, 2006

(65) Prior Publication Data

US 2007/0162275 A1    Jul. 12, 2007

(51) Int. Cl.
  *G06F 17/27*    (2006.01)
  *G06F 17/30*    (2006.01)
(52) U.S. Cl. .......................................... 704/9; 707/755
(58) Field of Classification Search ....................... None
  See application file for complete search history.

(56) References Cited

U.S. PATENT DOCUMENTS

| 5,331,556 A * | 7/1994 | Black et al. ..................... 704/9 |
| 2002/0111793 A1* | 8/2002 | Luo et al. ..................... 704/10 |
| 2004/0078190 A1* | 4/2004 | Fass et al. ..................... 704/7 |
| 2004/0111262 A1* | 6/2004 | Maison et al. .............. 704/251 |

OTHER PUBLICATIONS

Spiegel M. and Winslow E., "Database preprocessing and human-interface issues in reverse directory assistance (ACNA) services", Proc. IV TTA-96, 105-110, Basking Ridge, 1996.
Scharenborg O., Sturm J. and Boves L., "Business Listings in Automatic Directory Assistance", Proceedings Eurospeech 2001, Aalborg, Denmark, pp. 2381-2384.

* cited by examiner

*Primary Examiner*—David R Hudspeth
*Assistant Examiner*—Samuel G Neway
(74) *Attorney, Agent, or Firm*—Harrington & Smith

(57) ABSTRACT

A method includes applying at least one tag to at least one data element stored in a database the tag having at least one associated rule, utilizing the at least one associated rule to generate at least one variant of the data element, and storing the at least one variant in the database.

18 Claims, 4 Drawing Sheets

```
DEFINE TAGS AND RULES      STEP 1
          |
APPLY TAGS TO              STEP 2
DATA ELEMENTS
          |
CREATE VARIANTS            STEP 3
          |
MATCH A REQUEST TO         STEP 4
AN ELEMENT OR VARIANT
```

NATURAL LANGUAGE INTERACTION WITH LARGE DATABASES

TECHNICAL FIELD

This invention relates generally to a method and apparatus for generating text variants in databases.

BACKGROUND

It is known in the art to provide natural language access to large databases such as those comprised of telephone directories, stock libraries, book libraries, and the like. Request for data from such databases are often written in natural text or spoken and converted into their textual content. Similarly, responses to requests are likewise provided in either a textual format or converted to spoken language.

Ideally, every request would recite a portion of the desired data element to be accessed verbatim so as to aid in identifying precisely which data element is desired. Unfortunately, the format of the data stored in such databases, usually in a text format, often times differ significantly from the format in which such data is requested. For example, words or phrases contained in the text may be omitted or added. In addition, the order of words may be changed. Other words may be substituted for with synonyms, while in other instances, paraphrasing may be employed.

The result of such discrepancies is that it is not possible to match requests for data with the data requested.

SUMMARY OF THE PREFERRED EMBODIMENTS

In an exemplary embodiment of the invention, a method includes applying at least one tag to at least one data element stored in a database the tag having at least one associated rule, utilizing the at least one associated rule to generate at least one variant of the data element, and storing the at least one variant in the database.

In another exemplary embodiment of the invention, a system includes a database in which is stored at least one data element, means for applying at least one tag to the at least one data element the tag having at least one associated rule, means for utilizing the at least one associated rule to generate at least one variant of the data element; and means for storing the at least one variant on the database.

In yet another exemplary embodiment of the invention, a signal bearing medium tangibly embodies a program of machine-readable instructions executable by a digital processing apparatus to perform operations to generate variants of data elements, the operations including applying at least one tag to at least one data element stored in a database, the tag having at least one associated rule, utilizing the at least one associated rule to generate at least one variant of the data element and storing the at least one variant in the database.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

Figure 1:
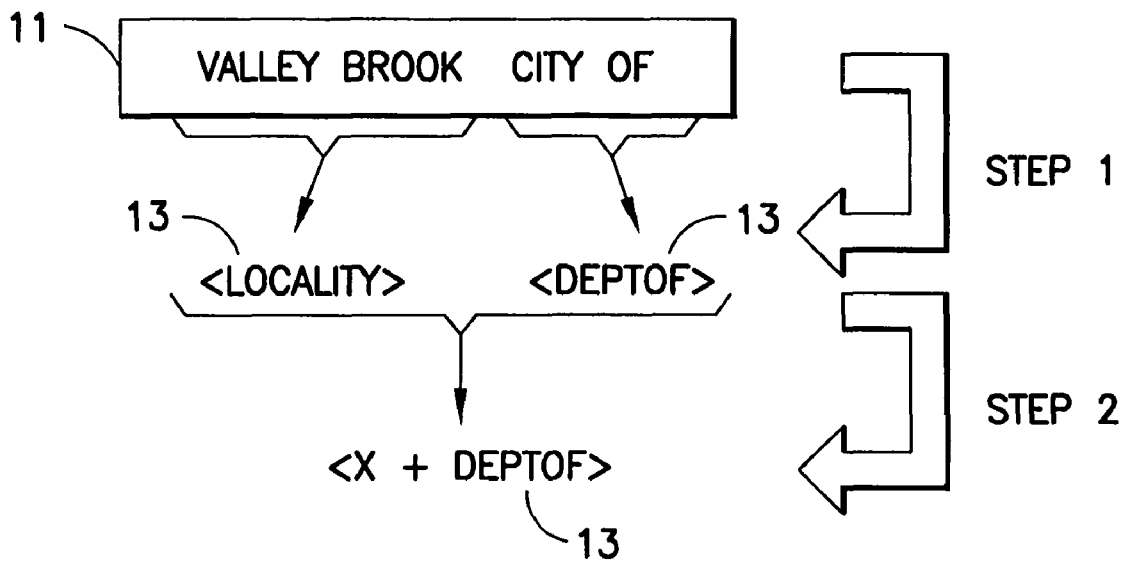
FIG. 1 is a flow chart of an exemplary method by which a data element is tagged.

An aspect of this invention addresses a need for a method of augmenting an existing database to contain alternate listings, or variants, of existing data elements to increase the likelihood that requests can be mapped to desired responses. In an exemplary embodiment of the invention, a two step technique is employed whereby data is manually tagged and a transformation procedure is subsequently applied to the data via the application of rules associated with the tags. Once tagged, the transformation procedure generates a multitude of variants of the original data to which the tags have been applied. As is described more fully below, the method by which the manual tagging of the data is performed enforces an advantageous uniformity over the manner in which variants are generated. In addition, once tagged, the rules associated with each tag may be altered and updated as required allowing for the automated regeneration of variants.

In an exemplary embodiment of the invention, data is manually parsed through the application of tags to the data. As used herein, and not as a limitation, "data" refers to text strings. A text string is formed of a plurality of binary values, typically bytes, wherein each typically corresponds to a single character in an alphabet such as ASCII or EBCEDIC. Such text strings typically describe entities such as, for example, "Chen, Stanley, MD". Note that this example of data comprises a listing containing three pieces of discernible information. Specifically, the individual's first name is "Stanley", the last name is "Chen", and the individual's profession is that of an "MD". Were this information to be stored in a relational database, a table formed of at least three fields representing the first name, last name, and profession would be utilized. One could then query the database using, for example, structured query language (SQL) to find and retrieve information contained in any of the fields.

Often times data is not, in its original form, particularly well suited for storage in a relational database. An example of such data is the textual data that forms directory listings such as phone books and the like. There are few if any format requirements imposed upon such data and, as a result, the data is not easily broken up into individual column entries of a table such as are utilized in relational databases. In addition, the manner in which such data is routinely queried lacks formal structure. As a result, such queries often times cannot be issued in languages such as SQL.

As noted above, requests to identify a particular item of data within a database containing text strings are often transcribed or converted from the spoken word. For example, a request to retrieve the above noted sample entry might request "Dr. Chen", "Mr. Chen, MD", "Dr. Stanley Chen" and various other variations, or variants.

Examples of data entries and a query that might be issued to retrieve the data entry are as follow:

Entry 1: "Bank A; Departments; Small Business; Card Merchant Services 2123847402 NEW YORK CITY"

Query 1: "Bank A merchant services"

Entry 2: "U.S. Government; Congress; Senators; Doe John; Washington D.C. Office 2022343445 SAINT PAUL"

Query 2: "office of senator John Doe"

Regardless of the format of the request, in the preceding example, it is nevertheless required that the request be effectively mapped to the entry "Chen, Stanley, MD".

In an exemplary embodiment of the invention, each data entry element is tagged and the tags are used to generate a multitude of variants. As described more fully below, there is at least one rule associated with each tag. Once a text string is tagged, the rules associated with the tags are applied in an automated fashion to generate multiple variants of the original text string.

With reference to FIG. 1, there is illustrated an exemplary application of tags 13 to a data element 11. In the example, data element 11 is a text string formed of the text "Valley Brook City of". At step 1, a first level parse is manually performed. As used herein, a "parse" is any application of tags 13 to either a data element 11 or another tag 13 that serves to define an attribute of the tag 13 or data element 11 to which the tag 13 is applied. Furthermore, a "first level parse" refers to an initial parsing of a data element 11, while a "second level parse" refers to a parse performed upon the output of a first level parse, and so on. As is therefore evident, more than one parse can be applied to a data element 11 and, in practice, it is likely that different data elements 11 will be subjected to differing numbers of parses.

Returning to the example, a first level parse of the data element results in two tags 13, <locality> and <dept of >, being applied to the data element 11. Specifically, the <locality> tag 13 is assigned the value of "Valley Brook" and the <deptof> tag 13 is assigned the value of "City of". Applying a second level parse at step 2, the <X+deptof> tag is assigned two children tags 13, specifically, <locality> and <deptof>. By way of explanatory convention, the results of the parse may be written as:

Valley Brook City of: data element

<-locality-><-deptof->: level 1 parse

<------X+deptof------>: level 2 parse

Figure 2:
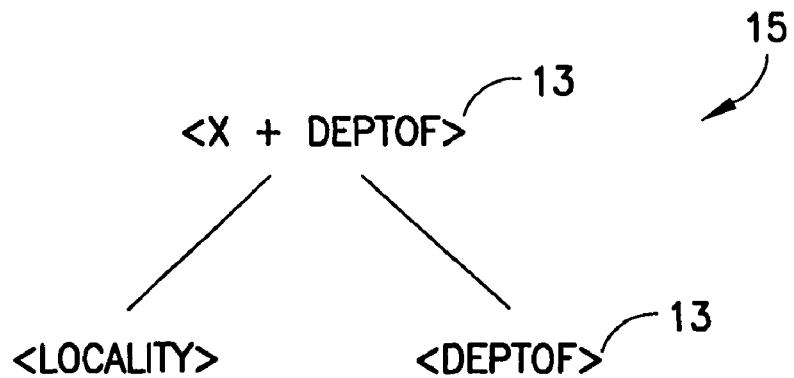
FIG. 2 is an illustration of an exemplary embodiment of a parse tree for the data element of FIG. 1.

With reference to FIG. 2, there is illustrated the hierarchical relationship of the exemplary tags 13 applied to the data element 11 as described above so as to form a parse tree 15. As is evident from its description, the tag <X+deptof> defines the combination of the tag <deptof> with at least one other, not specifically specified, tag 13. In the example shown, the additional tag is <locality>. In the parse tree 15, tags <locality> and <deptof> form the children of tag <X+deptof>. Once tagged, the rules associated with each tag 13 may be applied in a top down fashion starting at the top most tag in the parse tree 15 and proceeding until all possible variants have been generated.

As described herein, the rules associated with each tag 13 are described in terms of their functioning without reference to the manner in which such functionality is implemented. It is understood that any number of suitable methodologies involving the execution of computer code can be implemented to both encode the logic associated with each rule as well as to implement the logic so encoded. As illustrated, an exemplary rule associated with the tags 13 of FIGS. 1 and 2 might appear in pseudo-code as:

<X+deptof>=<X>_<deptof> and <deptof>_X.

Such pseudo-code is read to define the resolving of <X+deptof> to two variants. Specifically, the first variant is formed of the data element associated with the child of <X+deptof> that is not <deptof> followed by a space, " ", followed by the data element associated with <deptof>. The second variant is formed of the data element associated with <deptof> followed by a space, " ", followed by the data element associated with the child of <X+deptof> that is not <deptof>. The result of applying this rule results in the variants, "Valley Brook City of" and "City of Valley Brook". Note that, as defined, the exemplary variant generation required only a single level of resolving to generate the variants. This results from the fact that the parse tree 15 defines parent node <X+deptof> as having only one layer of children nodes, or tags 13, beneath it. Therefore, proceeding from the top of parse tree 15 at tag <X+deptof> to the bottommost children of the parse tree requires only one iteration of resolving.

Even in the instance of a single level process of resolving the top most tag 13 into all possible defined variants, it is sometimes necessary to apply more than one rule as described above. For example, in addition to the rule defined above associated with the tag <X+deptof>, the tag <deptof> may likewise have associated with it the following rule:

<deptof>=dept_of and dept

This pseudo-code is read to define the tag <deptof> as resolving to two variants, specifically the component of the associated data element that is not the word "of", followed by a space, followed by "of", as well as the component of the associated data element that is not the word "of" in isolation. When such a rule is applied in concert with the rule defined above, the result is four variants: "Valley Brook City of", "Valley Brook City", "City of Valley Brook", and "City Valley Brook". Note that, in the example, the application of the rules to the tags 13 results in a recitation of the original data element, "Valley Brook City of", two variants which are likely equivalent to the manner in which a speaker might request information, "Valley Brook City" and "City of Valley Brook", and one unlikely construction, "City Valley Brook". A similar distribution of resulting variants is possible, but not required, for any particular data element.

Figure 3:
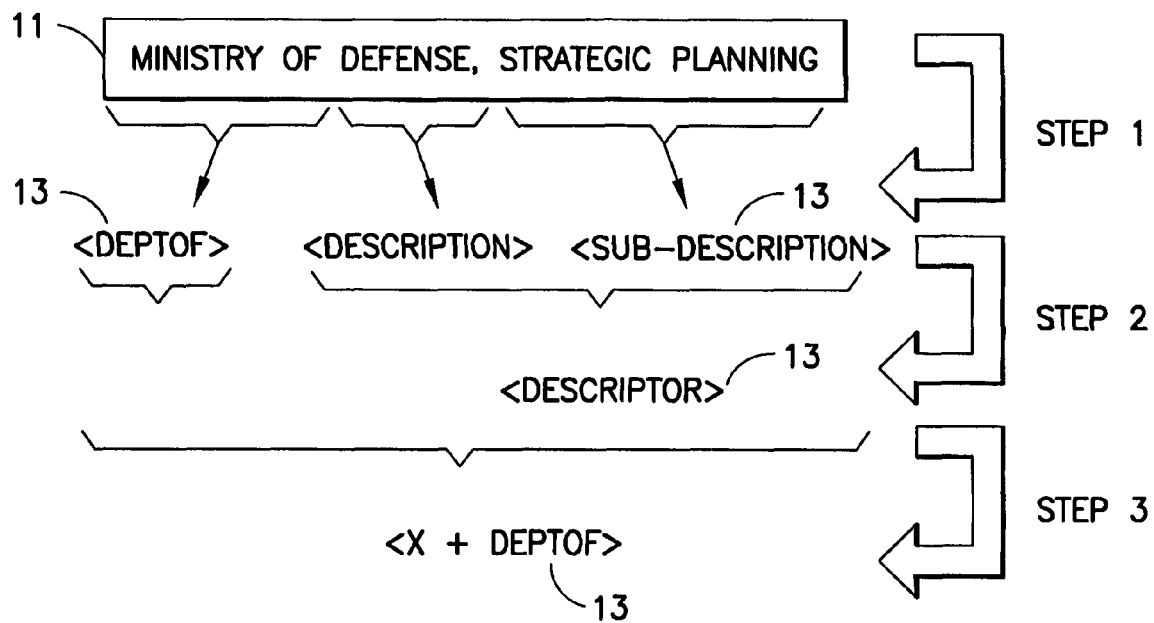
FIG. 3 is an illustration of an exemplary method by which a data element is tagged.
Figure 4:
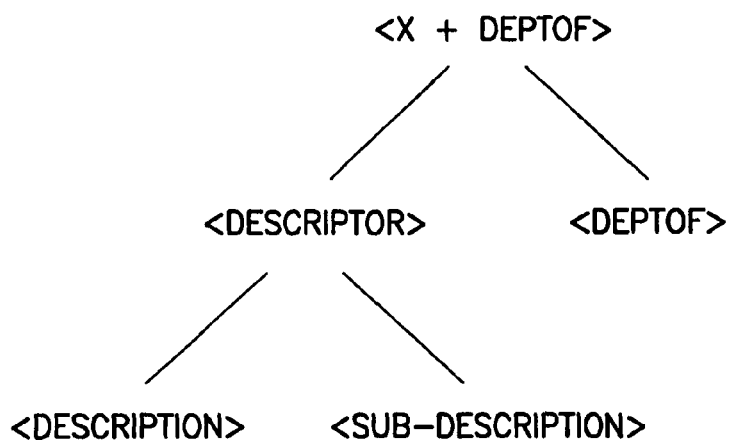
FIG. 4 is an illustration of an exemplary embodiment of a parse tree for the data element of FIG. 3.

With reference to FIG. 3, there are illustrated the exemplary steps which may be taken to tag a data element 11 such that the associated parse tree has more than two levels. As before, the data element 11 is ultimately tagged with the tag <X+deptof>. In this instance, <deptof> is paired with the tag <descriptor>. <descriptor> is further broken down into tags <description> and <subdescription>. <description> is associated with the text "Defense" and <subdescription> is associated with the text "Strategic Planning". In this example, the rule associated with the tag <descriptor> may take the form:

<Descriptor>=<description> and

<description>,_<subdescription>

While the exemplary rules illustrated above involve generating permutations of the text forming the data elements 11 with which each rule is associated, the rules of the invention are not so limited. Rather the invention is broadly drawn to encompass any and all forms of rules that encode instructions for the manipulation of data elements. For example, instead of manipulating only the text of a data element 11 associated with a rule, a rule may operate to substitute other text not part of the data element 11 when generating variants. An example of such a parse is as follows:

Andrews Thomas Smith and Acme Attorneys: data element

<-------------anyorder-------><-biztype->: level 1 parse

In this example, the rule associated with tag <anyorder> generates all subsets of names in any order forming the text "Andrews Thomas Santa and Tetris". The rule associated with tag <biztype> functions, in part, to generate synonyms for some or all of business identifiers in the text of the data element 11 associated with the tag <biztype>. For example, in addition to generating "Attorneys", the rule associated with the tag <biztype> might also generate "Attorneys at law", "Lawyers", "Law Firm", and the like. In such an instance, the rule or rules associated with the tag <biztype> are therefore specific to the text of a data element 11. Such specificity allows the data element "Tommy's Automobile Repair" tagged with the tag <biztype> to generate the variant "Tommy's Car Repair" while preventing the data element "AAA" tagged with the tag <name> from generating the variant "American Car Association".

Note that the tag 13 names can denote a semantic content (<locality>,<biztype>) or a functional description of the rule associated with the tag 13 (<any order>). Examples of other exemplary tags 11 and the function of their exemplary associated rules 13 are illustrated with reference to Table 1.

TABLE 1

| Tag | Rule/Function |
| --- | --- |
| <required> | Will always be outputted |
| <optional> | May be skipped |
| <any order> | Words of text may be outputted in any order |
| <bag of words> | Some subset of words may be outputted |
| <name> | Name of business/brand name |
| <biz type> | Description of a business |
| <location> | City, state, street, etc. |
| <sub description> | Sub-description, department name |
| <deptof> | E.g. Dept of, Office of, City of, etc. |
| <comment> | E.g. (Fax Line), (24 hours) |
| <verbatim> | Output exactly as written |

Figure 5:
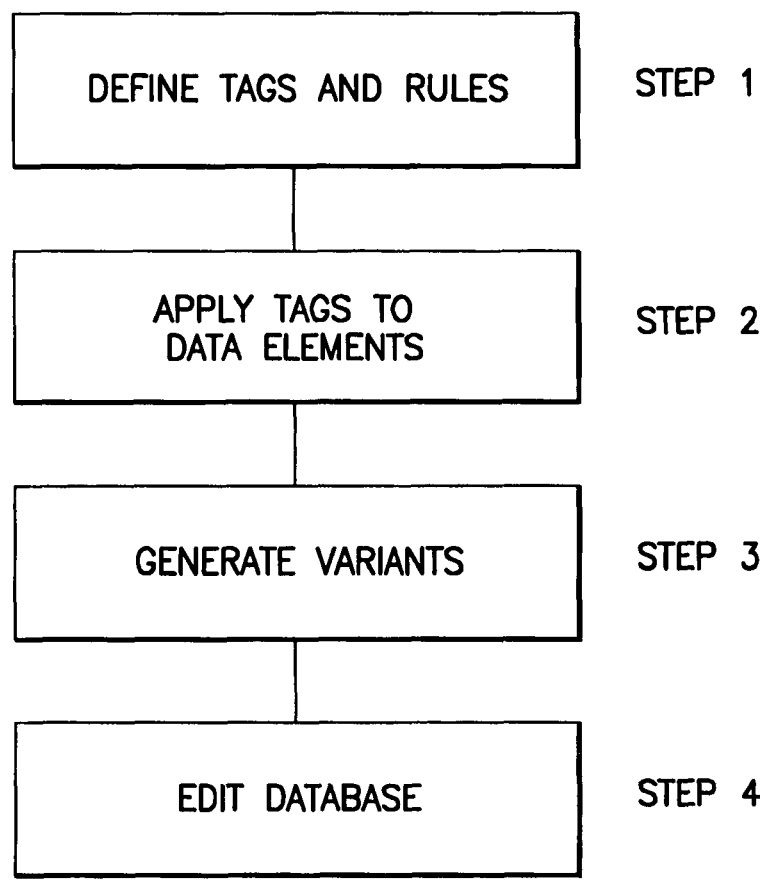
FIG. 5 is an illustration of an exemplary method of the invention.

With reference to FIG. 5, there is illustrated a block diagram of an exemplary method of the invention. At step 1, the tags and their associated rules are defined. As noted above, there is no limit placed on the number or form of tags or on the rules that accompany them. New tags may be created as needed. In addition, existing rules may be changed and new rules may be created at any time.

At step 2, tags 13 are applied to one or more data elements 11 stored in a database. Tagging may be typically performed by one or more sentient beings, such as a human operator. Tagging may be accomplished through an interface, such as a graphical user interface (GUI). The GUI displays each data element and permits the operator to apply tags to the text forming each data element. By defining a finite number of tags in step 1 to be applied to the data elements in step 2, a desirable level of uniformity is achieved when more than one operator works on the same one or more data elements 11 stored in a database. In other embodiments the tagging operation may be performed by software in an automated fashion, with or without human assistance.

Figure 6:
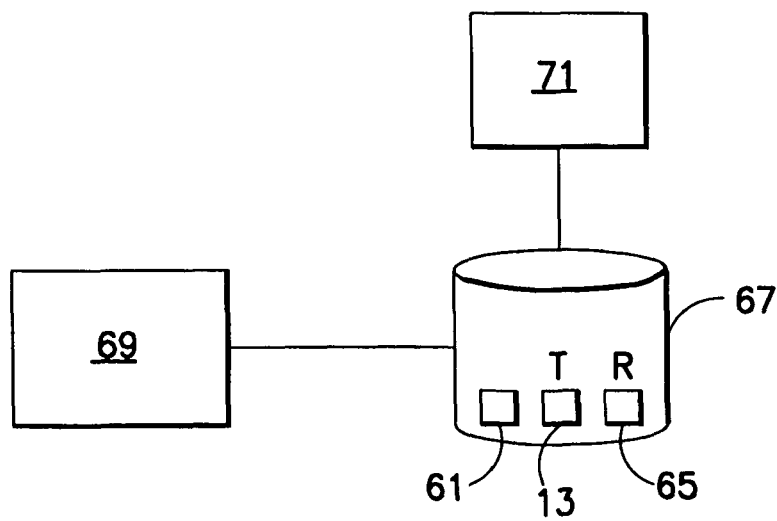
FIG. 6 is a diagram of an exemplary system for practicing the invention.
Figure 7:
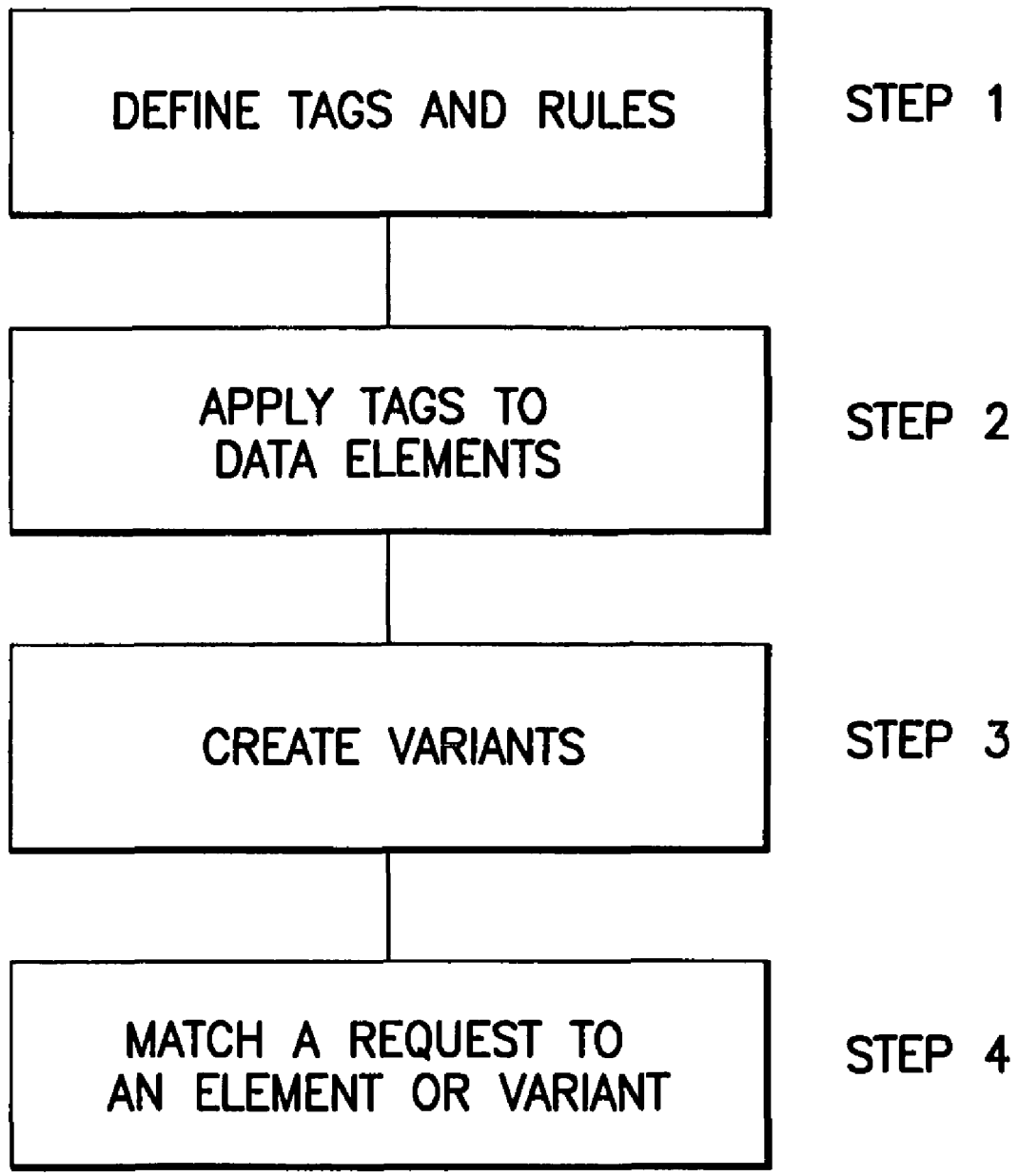
FIG. 7 is a flow chart of a further exemplary method of the invention.

At step 3, variants for each data element are generated by a process of applying the rules 13 associated with the tags 11 as described above. The generated variants are stored in the database as data elements 65. With reference to FIG. 6, there is illustrated an exemplary embodiment of a system for practicing the invention. A database 67 stores the data elements 65, tags 11, and rules 13. Database 67 may be any device capable of storing and retrieving digital data. Database 67 is coupled to a processor 71. Processor 71 operates to control the operation of database 67 using either hardware encoded machine instructions or software encoded machine encoded instructions. Processor 71 is utilized to perform the generation of variants from the data elements 65, tags 11, and rules 13 stored on database 67, to store the variants upon database 67, and to instruct the inputting of data from and outputting of data to interface 69. An interface 69 is coupled to database 67. Interface 69 may be utilized to both input data, such as data elements 65, tags 11, and rules 13, into database 67 as well as to accept output from database 67. Once generated, the data elements and variants 65 are stored in database 67 as individually accessible data structures, preferably text strings, for access and manipulation by processor 71.

Once the variants are generated at step 3, an operator can view the variants on interface 69 and edit the database 67 at step 4 as desired. For example, an operator may wish to delete one or more variants from the database 67. This situation typically results when the rules employed to generate variants operate to produce one or more variants which lack an amount of syntactic correctness to merit retaining. In addition, an operator may decide to change the manner in which tags 11 were assigned to a data element 65 after viewing the variants that such tagging produced.

The invention's ability to generate variants from separately defined tags 11 and rules 13 provides a beneficial degree of control and flexibility. For example, after changing the definition of a single rule 13, one can proceed to regenerate all of the variants for an entire database in an automated fashion.

In an alternative exemplary embodiment of the invention, the step of applying tags 11 to data elements 65 may be partially or wholly automated. After a portion of the data elements 65 in database 67 have been tagged, any manner of statistical analysis or parsing may be applied to discern, and output an indication of, the propriety of mapping specific tags to particular text strings or text string structures. Once so mapped, the output of the statistical parsing may be applied to data elements 65 which have not been previously manually tagged so as to tag them in an automated manner. In addition to a purely statistical analysis of data elements 65, such analysis may make use of a knowledge of the language in which the data element is written such as that which can be extracted from resources such as Wordnet™ or other sources of lexical and semantic information.

As noted above, post generation in step 3, the data elements and variants 65, as well as the tags 11 and rules 13 may be edited by a user, such as via interface 69. Such editing may be performed to remove unwanted variants 65, or to alter or otherwise modify existing tags 11 and rules 13.

With reference to FIG. 6, there is illustrated an alternative exemplary embodiment of the invention wherein the database 67, containing the data elements 65 and the generated variant data elements 65, is used to respond to requests for data such as requests for information found in phone or other directory listings. As illustrated at step 4, a request, typically submitted in a textual format, is matched to a data element or variant data element 65. In an exemplary embodiment, a statistical matching is performed to determine which data element or variant 65 most closely matches the request. In such instances, there is often times created a database 67 of each request and the data element or variant 65 which was determined to be responsive to the request. In such instances, statistical modeling may be applied to such a database to derive tags 11 and rules 13 in an automated fashion.

Such statistical modeling and statistical parsing is described more fully with reference to (1) F. Och, "Statistical Machine Translation: From Single Word Models to Alignment Templates," Ph.D. thesis, RWTH Aachen, Germany, 2002, (2) Eugene Charniak, "Statistical Parsing with a Context-Free Grammar and Word Statistics", Proc. AAAI, pp. 598-603, 1997, and (3) Michael Collins, "A New Statistical Parser Based on Bigram Lexical Dependencies," Proceedings of the Thirty-Fourth Annual Meeting of the Association for Computational Linguistics, pp. 184-191, 1996.

As noted, an exemplary use of the method and resulting database 67 of the invention is for use in responding to queries for directory listed data. By generating many variants, the method of the invention increases the likelihood that a request for data will match, or nearly match, one of the generated variants stored on the database 67. As queries are matched to data elements 65 and their variants, it is possible to keep track of which data elements 65 and their variants are more or less likely to be requested in relation to other variants of the same data element 65. Such information is useful when responding to requests as it is indicative of the most probable manner in which a requester would prefer to receive results. In addition, such information allows one, operating in accordance with the invention, to generate questions for the provision by a user of additional information when attempting to match a query to a data element or variant 65.

Although described in the context of particular embodiments, it will be apparent to those skilled in the art that a number of modifications and various changes to these teachings may occur. Thus, while the invention has been particularly shown and described with respect to one or more exemplary embodiments thereof, it will be understood by those skilled in the art that certain modifications or changes may be made therein without departing from the scope and spirit of the invention as set forth above, or from the scope of the ensuing claims.

What is claimed is:

1. A method comprising:
    associating, by a processor, a tag with at least one individual one of a plurality of data elements that comprise an original string stored in a database, each tag having an associated rule from a plurality of rules;
    utilizing, by a processor, said tag and said associated rule to generate a variant of a data element associated with said tag, wherein parsing is utilized to associate the tag with the at least one individual one of the plurality of data elements of the original string, wherein the parsing involves more than two levels of parsing and the rules associated with each tag are configured to be altered and updated and permit for automatic regeneration of variants;
    storing said variant in said database;
    altering said rule in response to said generated variant by changing a definition of said rule;
    receiving a request;
    comparing, at the processor, said request to said data element and to said variant; and
    selecting at least one of said data element and said variant corresponding to said request,
    wherein the processor is configured to divide a tag into multiple tags and to generate a variant for each of the multiple tags, wherein the more than two levels of parsing comprise a first level parsing as an initial parsing, a second level parsing as a parsing performed upon an output of the first level parsing, and a third level parsing as a parsing performed upon an output of the second level parsing.

2. The method of claim 1, wherein said tag and said associated rule are generated in an automated fashion.

3. The method of claim 1, comprising utilizing statistical parsing to associate the tag with a data element.

4. The method of claim 1, wherein said original string comprises a text string.

5. The method of claim 1, comprising editing said variant.

6. The method of claim 1, comprising:
    receiving a request for at least one of said data element and said variant;
    comparing said request to said data element and said variant; and
    selecting at least one of said data element and said variant corresponding to said request.

7. The method of claim 6, wherein said request comprises text.

8. The method of claim 7, wherein said text comprises natural language.

9. The method of claim 1, wherein the plurality of rules relates to an inclusion of comments.

10. The method of claim 1, wherein the plurality of rules relates to an inclusion of a sub-description.

11. A system comprising:
    a database in which is stored a data element of an original string;
    means for automatically associating a tag with at least one individual one of a plurality of data elements that comprise the original string, each tag having an associated rule from a plurality of rules;
    means for automatically utilizing said tag and said associated rule to generate a variant of said data element associated with said tag, wherein parsing is utilized to associate the tag with the at least one individual one of the plurality of data elements of the original string, wherein the parsing involves more than two levels of parsing and the rules associated with each tag are configured to be altered and updated and permit for automatic regeneration of variants;
    means for storing said variant in said database;
    means for altering said rule in response to said generated variant by changing a definition of said rule;
    means for receiving a request;
    means for comparing, at the processor, said request to said data element and to said variant; and
    means for selecting at least one of said data element and said variant corresponding to said request,
    wherein the means for automatically associating is configured to divide a tag into multiple tags and to generate a variant for each of the multiple tags, wherein the more than two levels of parsing comprise a first level parsing as an initial parsing, a second level parsing as a parsing performed upon an output of the first level parsing, and a third level parsing as a parsing performed upon an output of the second level parsing.

12. The system of claim 11, comprising:
    means for receiving a request for at least one of said data element and said variant;
    means for comparing said request to said data element and said variant of said data element; and
    selecting at least one of said data element and said variant corresponding to said request.

13. A non-transitory computer readable storage medium embodied with a computer program of machine-readable instructions executable by a digital processing apparatus to perform operations to generate variants of data elements, the operations comprising:
    automatically associating, by a processor, a tag with at least one individual one of a plurality of data elements that comprise an original string stored in a database, each tag having an associated rule from a plurality of rules;
    automatically utilizing said tag and said associated rule to generate variant of a data element associated with said tag, wherein parsing is utilized to associate the tag with the at least one individual one of the plurality of data elements of the original string, wherein the parsing involves more than two levels of parsing and the rules associated with each tag are configured to be altered and updated and permit for automatic regeneration of variants;

storing said variant in said database;

altering said rule in response to said generated variant by changing a definition of said rule;

receiving a request;

comparing, at the processor, said request to said data element and to said variant; and selecting at least one of said data element and said variant corresponding to said request, wherein the processor is configured to divide a tag into multiple tags and to generate a variant for each of the multiple tags, wherein the more than two levels of parsing comprise a first level parsing as an initial parsing, a second level parsing as a parsing performed upon an output of the first level parsing, and a third level parsing as a parsing performed upon an output of the second level parsing.

14. The non-transitory computer readable storage medium of claim 13, comprising defining said tag and said associated rule.

15. The non-transitory computer readable storage medium of claim 14, wherein said tag and said associated rule are generated in an automated fashion.

16. The non-transitory computer readable storage medium of claim 13, comprising utilizing statistical parsing to associate said tag with said data element.

17. The non-transitory computer readable storage medium of claim 13, wherein said data element is a text string.

18. The non-transitory computer readable storage medium of claim 13, comprising:

receiving a request for said data element and said variant;

comparing said request to said data element and said variant; and selecting said data element and said variant corresponding to said request.

* * * * *